B. NORDIN.
CHAFF SEPARATOR FOR COFFEE MILLS.
APPLICATION FILED APR. 29, 1912.

1,052,616.

Patented Feb. 11, 1913.

Witnesses:
Robert H. Weir
J. H. Daggett

Inventor
B. Nordin
by H. Sanders
Atty.

UNITED STATES PATENT OFFICE.

BERNHARD NORDIN, OF BERGLAND, ONTARIO, CANADA.

CHAFF-SEPARATOR FOR COFFEE-MILLS.

1,052,616.  Specification of Letters Patent.  Patented Feb. 11, 1913.

Application filed April 29, 1912. Serial No. 693,866.

*To all whom it may concern:*

Be it known that I, BERNHARD NORDIN, a citizen of Sweden, residing at Bergland, in the district of Rainy River and Province of Ontario, in the Dominion of Canada, have invented certain new and useful Improvements in Chaff-Separators for Coffee-Mills, of which the following is a specification.

This invention relates to chaff separators for coffee mills and its object is to produce a device disposed within the mill and operatively connected to the grinding shaft for spreading the ground coffee as it falls into the mill and for blowing the chaff from it into a chaff drawer.

The invention consists in the combination and arrangement of parts to be hereinafter fully described in the following specification, pointed out in the claims and illustrated in the accompanying drawing which forms a part of the specification and in which—

Figure 1:
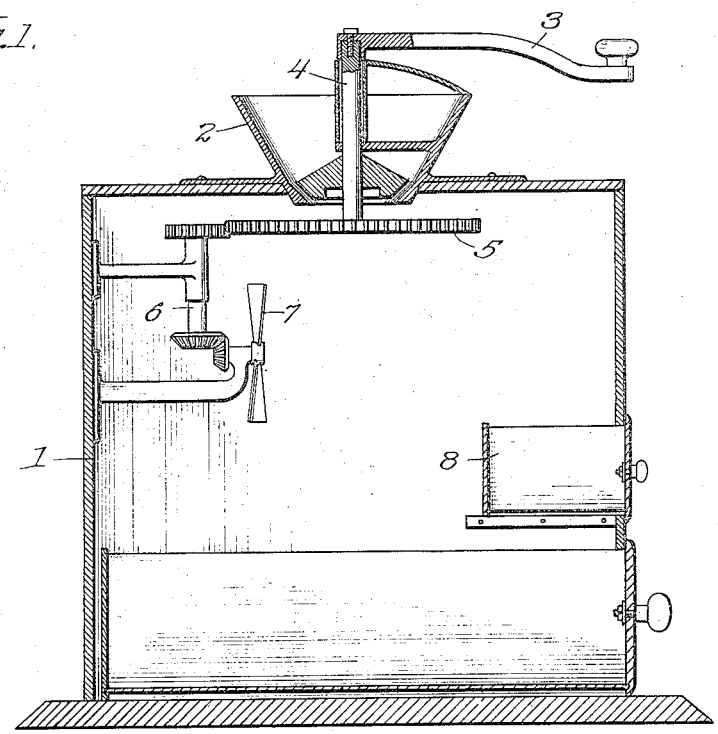
Figure 2:
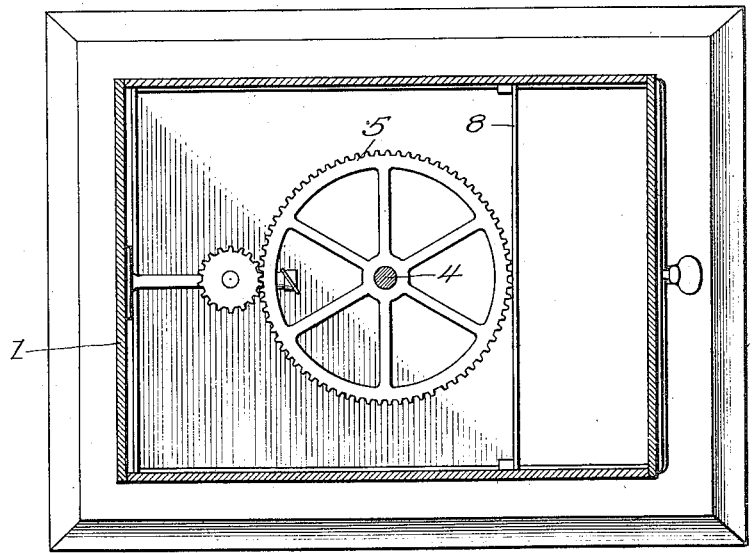

Figure 1 is a vertical section of a coffee mill provided with my chaff separator. Fig. 2 is a horizontal section of the same.

Like reference characters indicate corresponding parts throughout the several views.

1 is a coffee mill provided with a coffee chamber 2, crank 3 and grinding shaft 4. The ground coffee falls from the coffee chamber 2 into the mill and is separated by contact with a rotary spreader 5 terminally carried by the grinding shaft 4. The periphery of the spreader 5 is serrated for engagement with the terminal cog of a transmission shaft 6 the lower termination of which is bevel-geared to the shaft of a rotary fan 7. The action of the spreader 5 upon the falling coffee tends to separate it from the chaff, which is much lighter than the coffee, and the air currents produced by the rotary fan blow the chaff to the remote wall of the mill where it falls into a chaff drawer 8 which may be removed and emptied when the grinding operation is completed.

What is claimed is:—

1. In a chaff separator for coffee mills the combination with the grinding shaft of said mill, of a rotary spreader terminally carried thereby, a rotary fan disposed within said mill and transmission mechanism connecting the said spreader and rotary fan.

2. In a chaff separator for coffee mills the combination with the grinding shaft of said mill, of a rotary spreader terminally carried thereby, a fan disposed within said mill, transmission mechanism connecting the said spreader and fan and a chaff drawer removably secured within the said mill.

In testimony that I claim the foregoing as my own I have hereto affixed my signature in the presence of two subscribing witnesses.

BERNHARD NORDIN.

Witnesses:
C. O. KINDER,
OSCAR PETERSON.